Patented July 9, 1935

2,007,218

UNITED STATES PATENT OFFICE 2,007,218

STABILIZATION OF EMULSIFIED FOOD PRODUCTS

William Seltzer, Passaic, N. J., assignor to Kraft-Phenix Cheese Corporation, Chicago, Ill., a corporation of Delaware No Drawing. Application March 13, 1933, Serial No. 660,455

16 Claims. (Cl. 99—11)

Emulsified food products, particularly dairy products, such as ice cream, cheeses of certain types, and the like, and chocolate milk drinks, as well as chocolate syrup, salad dressings, and similar food products, usually require for their stability the addition of an emulsifying agent. Thus, in the manufacture of ice cream it has been customary to add gelatin as a stabilizer, in order that the body of the ice cream might be maintained under conditions of transportation and handling and the texture improved. Also, in such cheeses as cottage cheese, cream cheese, and the like, unless a stabilizing agent is added, the material tends to separate or "whey off", after a relatively short period, especially under conditions of room temperature at which such cheeses are frequently kept when dispensed in a small store.

I have discovered certain stabilizing compositions which behave in a markedly superior manner to anything of the sort previously known to me. The principal element of such compositions is locust bean gum, a gum which possesses markedly different characteristics from other gums with which I am familiar, particularly with respect to its greater water-swelling or water-absorbing quality and greater film-forming ability.

Of equal importance to the film-forming power of this material, it possesses the most unusual property of drying, from a water solution, to a clear and transparent, continuous, strong, flexible, and somewhat water-resisting film. Other gums, such as Arabic or Acacia, dry to a continuous film, but the film is extremely weak, nonflexible and very soluble. Nor does Arabic or Acacia possess any marked swelling power, a 50% solution being of the viscosity of about a 1% solution of locust bean gum. Tragacanth, Karaya, Shiraz, cherry gum, etc. possess considerable swelling power but the films they make are opaque, weak, brittle and non-continuous.

Another peculiar characteristic possessed by locust bean gum, in distinction to most other gums with which I am familiar, is the fact that it contains substantially no bassorin or cerasin, a gummy fraction which is found to excess in many other gums. The absence of this fraction in locust bean gum may be responsible for its peculiar and markedly superior properties when used for my purposes, although I am not in a position to bind myself positively to this theory. I believe, however, that it is this bassorin content which causes spots and pin-holes in the films formed by such gums as tragacanth, destroys the continuity of the film, weakens it, and imparts brittleness to it, and thus requires the use of large quantities of a gum which contains this fraction.

In combination with locust bean gum, in my preferred embodiments, I also use Irish moss, preferably refined as described in my co-pending application, Serial No. 642,602, filed November 14, 1932, and also Gum Karaya. The seaweed is used for its ability to neutralize the tendency of the locust bean gum to precipitate casein out of suspension, while the Gum Karaya is used to combat the tendency of the locust bean gum to dehydrate the material and produce a dry and crumbly product. The following are preferred proportions, by weight:

| | Parts |
|---|---|
| Locust bean gum | 65 |
| Irish moss | 35 |
| Gum Karaya | 15 |

The above ingredients are all mixed together in the form of a dry powder.

While the locust bean gum may be used with excellent results, with the addition of Irish moss alone in about the proportions indicated above, it is preferred to add the Gum Karaya for reasons which will appear later. In the use of the composition as a stabilizing agent for the purposes indicated above, it is preferred to dilute the mixture of locust bean gum, Irish moss and Karaya, with a suitable sugar, such as cerelose (corn sugar), in the proportion of two parts of cerelose to one part of the mixture of locust bean gum, Irish moss and Karaya. This dilution is desirable for the reason that, when so diluted, the material is not so powerful in its effects on an emulsion and can thus be handled much more easily and accurately to obtain the desired effects. Furthermore, when thus diluted, the material can be used in about the same proportions as gelatin and is thus more conveniently handled by the practical workers in this field.

When used in the preparation of cream cheese, the undiluted mixture of the three ingredients mentioned above is added at the time that the curds are mixed with the cream in the usual procedure for the manufacture of cream cheese, and in the proportion of about one-half of 1% by weight on a wet basis. The material is heated to about 165° F., homogenized, and then packed hot.

In the manufacture of cottage cheese, the mixture of the three ingredients described above may be added to the milk just prior to the setting operation, preferably in the proportion of less than one-fourth of 1%, and preferably between 0.1 and 0.2% on a wet basis. In cottage cheese the addition of my improved stabilizing composition acts to hold the moisture and prevent water separation or wheying off, and also tends to prevent development of acidity.

In ice cream, wherein my improved three-ingredient mixture is used diluted with sugar, as described above, in the preferred proportion of one-half of 1% on a wet basis, the stabilizer acts to prevent crystallization of ice particles and thus insures a fine, smooth texture and a body which will hold up under severe shocks, such as are encountered in transportation and handling. The use of my stabilizing composition in ice cream also usually results in more rapid freezing, especially in old-style freezers.

The use of my improved composition as described above, is attended by many advantages. Thus, it is much less costly than gelatin, besides being vastly superior in its action. For example, I have found that a cheese stabilized by the presence of my improved composition will stand up, without any tendency toward separation, for over five times as long as where ordinary stabilizers, such as gelatin, are used. In ice cream, greatly reduced quantities of my composition, as compared with the usual stabilizers, produce even superior results.

As stated above, I have found as a result of extensive study and experimentation that the three elements of the composition co-act in a peculiar way so as to produce the optimum results. Thus, the locust bean gum, which is characterized by superior film forming and exceedingly high water-absorption ability, is balanced by the Gum Karaya, which alone would tend to make a sticky product, as distinguished from one which may be described as crumbly, where locust bean gum alone is used. The two ingredients, when used together, therefore, co-operate to produce an ice cream or other emulsified product of the type described having a highly smooth texture and also, in the case of ice cream, great resistance to shocks, as a result of which it will stand up under very severe conditions of handling.

The use of Irish moss in combination with the other two ingredients still further improves the emulsified products due to the ability of the moss or analogous seaweed to neutralize the tendency of the locust bean gum to produce agglomeration and precipitation of the casein particles.

The locust bean gum alone and in combination with the other ingredients is of great value because of its ability to form a strong continuous film, flexible enough to withstand breakage strains. This is important in ice cream and in cheese, in that these films are believed to encase tiny ice crystals or lactose crystals, as the case may be, preventing these crystals from growing and thus tending to produce a smooth texture of great stability. The film-forming and water-absorption properties of the locust bean gum are also of value in the manufacture of cheeses as described above, in preventing separation or wheying off.

In the ageing of an ice cream mix before freezing, the use of the combination of ingredients described above is of great value in preventing the slow separation of casein and fat from whey and sugar. In this connection, the presence of Karaya and Irish moss acts to overcome the lack of film rigidity and lack of jell strength in the locust bean gum.

Various modifications, variations and improvements coming within the spirit of my invention will doubtless suggest themselves to those skilled in the art. Hence, I do not wish to be restricted to the specific embodiments described or uses mentioned except to the extent indicated in the appended claims, which are to be interpreted as broadly as the state of the art will permit.

I claim as my invention:

1. An emulsified food product stabilized by the presence of a relatively small quantity of locust bean gum, and Gum Karaya.

2. An ice-cream mix stabilized by the presence of a relatively small quantity of locust bean gum and Gum Karaya.

3. A cream cheese stabilized by the presence of a relatively small quantity of locust bean gum and Gum Kayara.

4. A cottage cheese stabilized by the presence of a relatively small quantity of locust bean gum and Gum Karaya.

5. A stabilizing composition for emulsified food products, comprising locust bean gum and Gum Karaya.

6. An emulsified food product stabilized by the presence of a relatively small quantity of locust bean gum, Gum Karaya, and a purified Irish moss.

7. An emulsified food product stabilized by the presence of a relatively small quantity of locust bean gum, and a purified Irish moss.

8. An ice-cream mix stabilized by the presence of a relatively small quantity of locust bean gum, Gum Karaya, and a purified Irish moss.

9. An ice-cream mix stabilized by the presence of a relatively small quantity of locust bean gum and a purified Irish moss.

10. A cream cheese stabilized by the presence of a relatively small quantity of locust bean gum, Gum Karaya, and a purified Irish moss.

11. A cream cheese stabilized by the presence of a relatively small quantity of locust bean gum and a purified Irish moss.

12. A cottage cheese stabilized by the presence of a relatively small quantity of locust bean gum, Gum Karaya, and a purified Irish moss.

13. A cottage cheese stabilized by the presence of a relatively small quantity of locust bean gum and a purified Irish moss.

14. A stabilizing composition for emulsified food products, comprising locust bean gum and a purified Irish moss.

15. A stabilizing composition for emulsified food products, comprising locust bean gum, a purified Irish moss, and Gum Karaya.

16. A stabilizing composition for use in an ice-cream mix or the like, comprising locust bean gum, a purified Irish moss, Gum Karaya, and a substantial portion of a sugar serving to dilute the other ingredients.

WILLIAM SELTZER.